United States Patent
Nakata et al.

(10) Patent No.: US 11,293,139 B2
(45) Date of Patent: Apr. 5, 2022

(54) WEB MANUFACTURING APPARATUS AND SHEET MANUFACTURING APPARATUS

(71) Applicant: SEIKO EPSON CORPORATION, Tokyo (JP)

(72) Inventors: Hirofumi Nakata, Matsumoto (JP); Kazuma Miyazawa, Shiojiri (JP); Sadaharu Komori, Shiojiri (JP); Masahide Nakamura, Matsumoto (JP); Yuki Oguchi, Okaya (JP); Soichiro Seo, Shiojiri (JP); Yoshiyuki Nagai, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 83 days.

(21) Appl. No.: 16/676,533

(22) Filed: Nov. 7, 2019

(65) Prior Publication Data
US 2020/0149219 A1    May 14, 2020

(30) Foreign Application Priority Data
Nov. 8, 2018    (JP) .............................. JP2018-210942

(51) Int. Cl.
*B21B 1/10*    (2006.01)
*D21B 1/10*    (2006.01)
*D21B 1/06*    (2006.01)

(52) U.S. Cl.
CPC .............. *D21B 1/10* (2013.01); *D21B 1/061* (2013.01)

(58) Field of Classification Search
USPC ........................................................ 162/254
See application file for complete search history.

(56) References Cited

U.S. PATENT DOCUMENTS

| | | | | |
|---|---|---|---|---|
| 3,085,756 | A | * | 4/1963 | Danforth ................ D21B 1/347 241/5 |
| 6,031,378 | A | * | 2/2000 | Rosin ..................... G01R 29/12 324/452 |
| 6,301,378 | B1 | * | 10/2001 | Karssemeijer ....... G06K 9/4604 378/37 |
| 6,524,442 | B2 | * | 2/2003 | Tanner ..................... D04H 1/72 162/261 |
| 2016/0239883 | A1 | * | 8/2016 | Yamagami ............. G06Q 50/04 |
| 2018/0021976 | A1 | | 1/2018 | Nakamura |

FOREIGN PATENT DOCUMENTS

| | | |
|---|---|---|
| JP | 2014-054286 A | 3/2014 |
| JP | 2016-160562 A | 9/2016 |

* cited by examiner

*Primary Examiner* — Jacob T Minskey
(74) *Attorney, Agent, or Firm* — Oliff PLC

(57) ABSTRACT

A web manufacturing apparatus includes a defibration section that includes a rotating blade and is configured to defibrate a material containing fiber, a detection section configured to detect an electric charge amount of a defibrated material obtained by the defibration section, and a control section configured to control operation of the defibration section. The control section includes a first mode in which a revolution speed of the rotating blade is set based on a detection result of the detection section.

7 Claims, 5 Drawing Sheets

WEB MANUFACTURING APPARATUS AND SHEET MANUFACTURING APPARATUS

The present application is based on, and claims priority from JP Application Serial Number 2018-210942, filed Nov. 8, 2018, the disclosure of which is hereby incorporated by reference herein in its entirety.

BACKGROUND

1. Technical Field

The present disclosure relates to a web manufacturing apparatus and a sheet manufacturing apparatus.

2. Related Art

In recent years, dry-method sheet manufacturing apparatuses have been proposed that use as little water as possible in order to be made more compact and consume less energy.

For example, JP-A-2014-54286 discloses a method in which paper fragments are defibrated into a fibrous form in a dry-method defibration machine, the defibrated fibers are lifted up by a flow of air and uniformly dispersed, and then accumulated on a mesh to form pulp fibers having a sheet shape.

However, fibers sometimes generate static electricity when defibrated using a dry-method defibration machine or when defibrated pulp is transported by an airflow. Depending on the amount of static electricity, the fibers may clump together (tangle into a clumped state). When the fibers are accumulated and formed into a sheet shape while such clumps are still present, the thickness of the sheet may become uneven. The quality of the obtained sheet may be reduced as a result.

SUMMARY

The present disclosure addresses the above issues, and may be realized in the following manner.

A web manufacturing apparatus of the present disclosure includes a defibration section that includes a rotating blade and is configured to defibrate a material containing fiber, a detection section configured to detect an electric charge amount of a defibrated material obtained by the defibration section, and a control section configured to control operation of the defibration section. The control section includes a first mode in which a revolution speed of the rotating blade is set based on a detection result of the detection section.

Another web manufacturing apparatus of the present disclosure includes a defibration section that includes a rotating blade and is configured to defibrate a material containing fiber, a supply section configured to supply the material to the defibration section, an input section to which information relating to a condition of the material to be supplied to the defibration section by the supply section is input, and a control section configured to control operation of the defibration section. The control section includes a second mode in which a revolution speed of the rotating blade is set based on the information.

Another web manufacturing apparatus of the present disclosure includes a defibration section that includes a rotating blade and is configured to defibrate a material containing fiber, an input section to which information correlated to an electric charge amount of a defibrated material obtained by the defibration section is input, and a control section configured to control operation of the defibration section. The control section includes a third mode in which a revolution speed of the rotating blade is set based on the information.

A sheet manufacturing apparatus of the present disclosure includes a web manufacturing apparatus of the present disclosure, and a sheet forming section configured to form a web manufactured by the web manufacturing apparatus into a sheet shape.

DESCRIPTION OF EXEMPLARY EMBODIMENTS

A detailed explanation of a web manufacturing apparatus and a sheet manufacturing apparatus of the present disclosure is given below based on preferable embodiments as illustrated in the accompanying drawings.

First Embodiment

Figure 1:
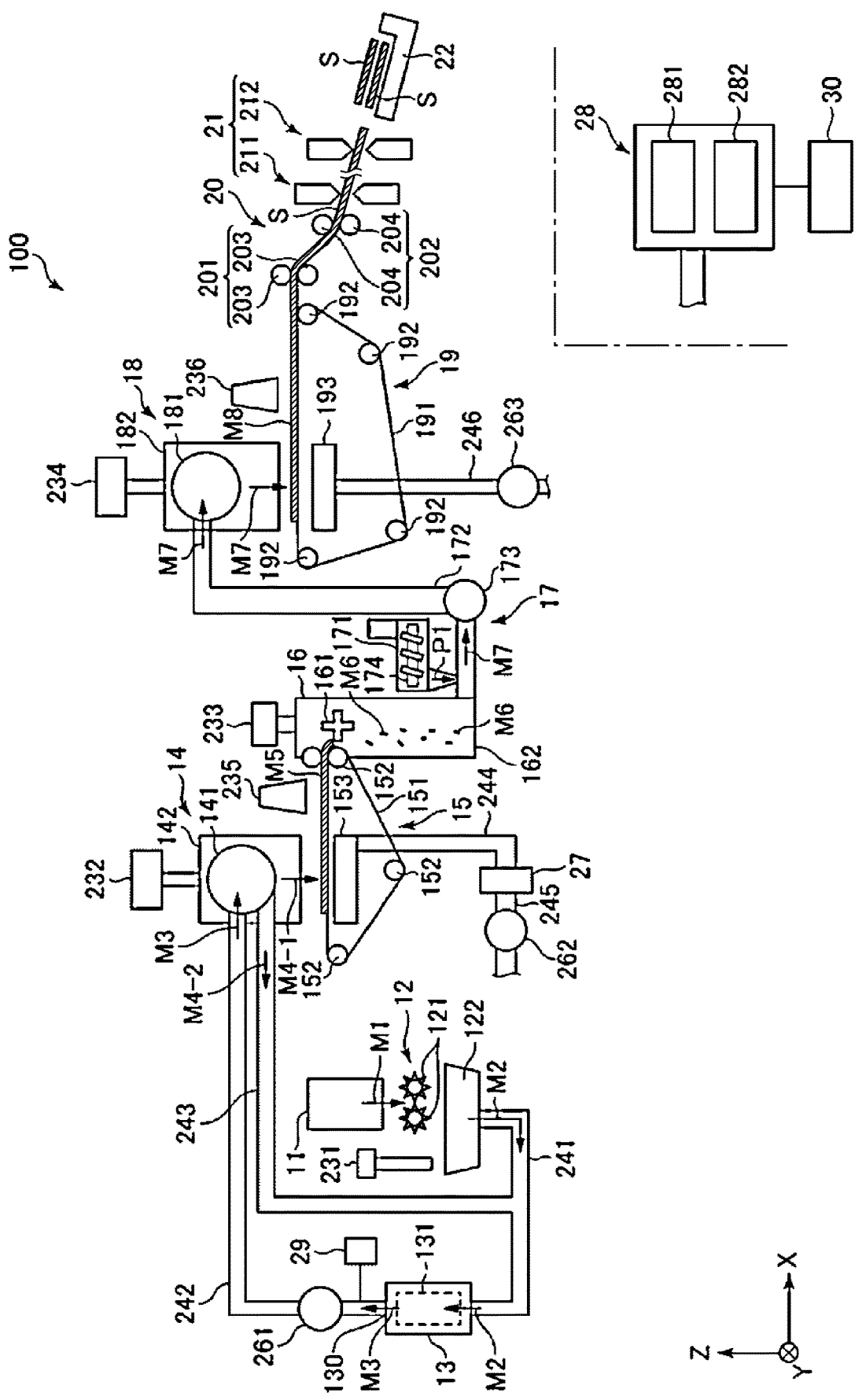
FIG. 1 is a schematic side view illustrating a first embodiment of a sheet manufacturing apparatus of the present disclosure.
Figure 2:
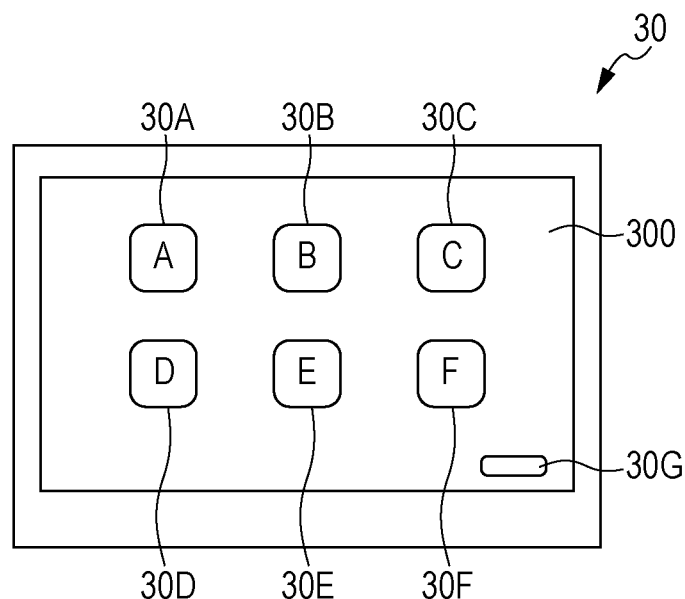
FIG. 2 is a plan view illustrating an input section of the sheet manufacturing apparatus illustrated in FIG. 1.
Figure 3:
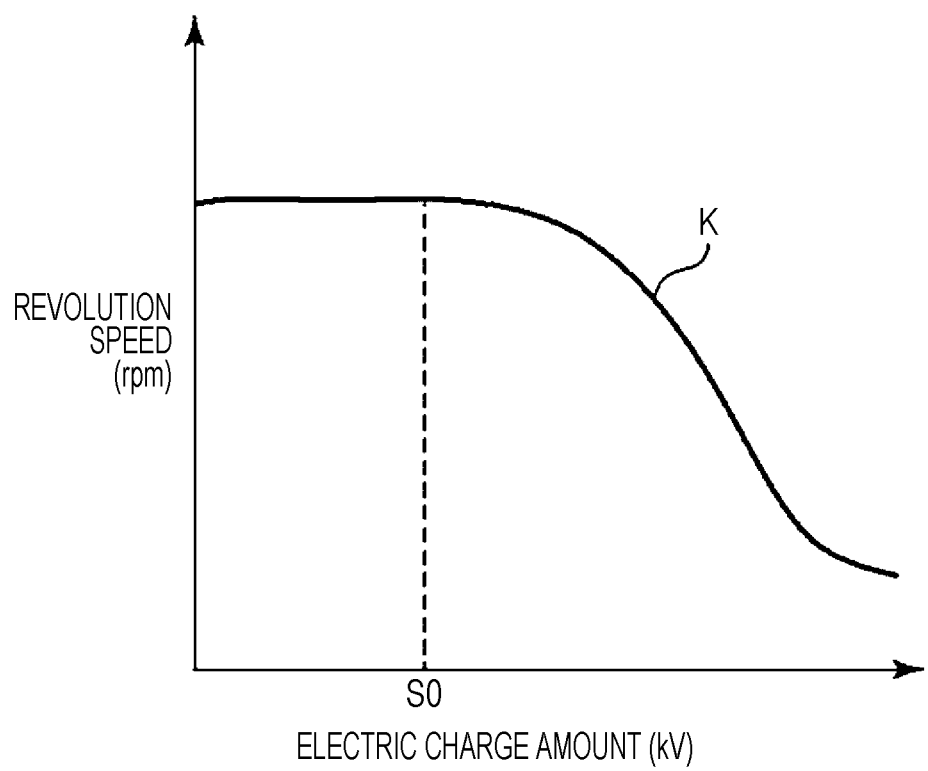
FIG. 3 is a graph illustrating a calibration curve stored in a storage section of a control section of the sheet manufacturing apparatus illustrated in FIG. 1.
Figure 4:
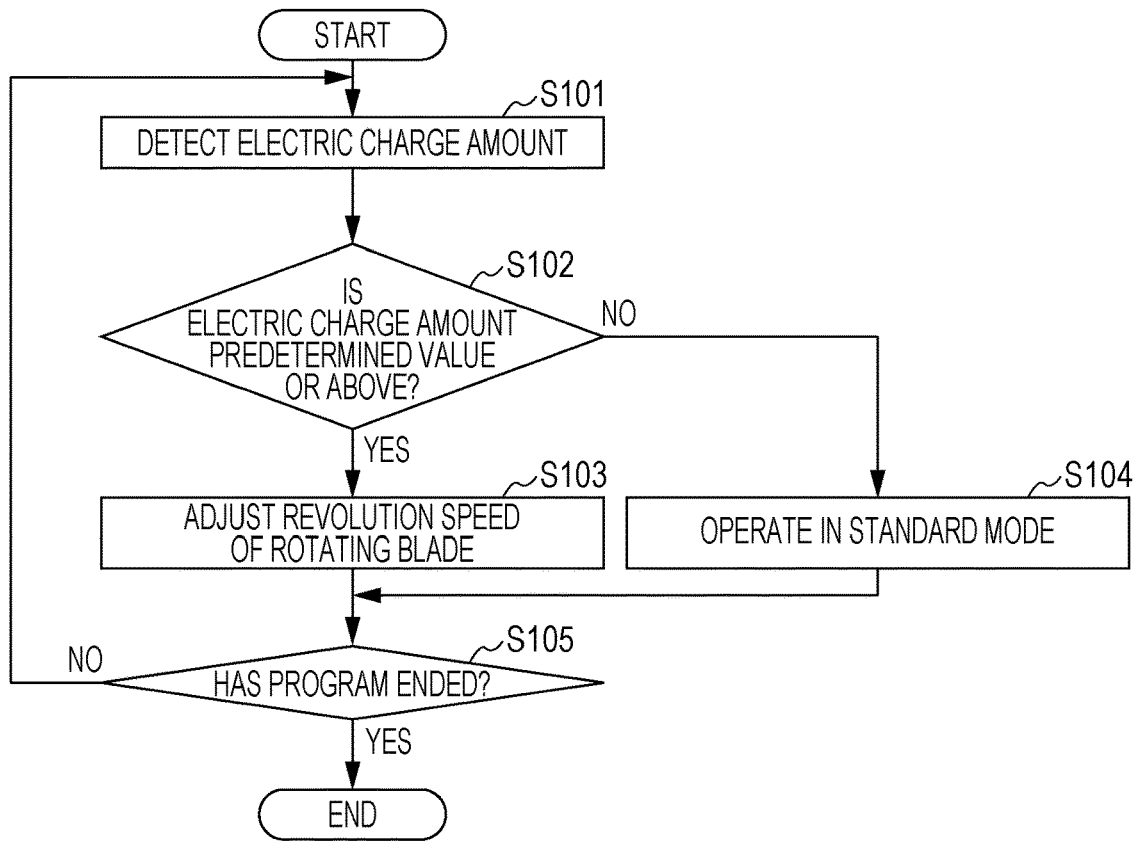
FIG. 4 is a flowchart for explaining a control operation executed by a control section of the sheet manufacturing apparatus illustrated in FIG. 1.

FIG. 1 is a schematic side view illustrating a first embodiment of a sheet manufacturing apparatus of the present disclosure. FIG. 2 is a plan view illustrating an input section of the sheet manufacturing apparatus illustrated in FIG. 1. FIG. 3 is a graph illustrating a calibration curve stored in a storage section of a control section of the sheet manufacturing apparatus illustrated in FIG. 1. FIG. 4 is a flowchart for explaining a control operation executed by the control section of the sheet manufacturing apparatus illustrated in FIG. 1.

For ease of explanation, three mutually orthogonal axes illustrated in FIG. 1 will be referred to as an x-axis, a y-axis, and a z-axis. The xy-plane including the x-axis and the y-axis is horizontal, and the z-axis is vertical. The direction indicated by the arrow on each of the axes is referred to as "+", and the opposite direction thereto is referred to as "−". The top side of FIG. 1 and FIG. 2 is sometimes referred to as upper or upward, and the bottom side thereof is sometimes referred to as lower or downward.

As illustrated in FIG. 1, a sheet manufacturing apparatus 100 includes a web manufacturing apparatus 1, a sheet forming section 20, a cutting section 21, a stacking section 22, and a collection section 27.

The web manufacturing apparatus 1 includes a feedstock supply section 11, a crushing section 12, a defibration section 13, a sorting section 14, a first web forming section 15, a shredding section 16, a mixer 17, a disentangling section 18, a second web forming section 19, a control section 28, a detection section 29, and an input section 30. Each of these sections is electrically coupled to the control section 28, and the respective operations thereof are controlled by the control section 28.

The sheet manufacturing apparatus 100 also includes a humidifier 231, a humidifier 232, a humidifier 233, a humidifier 234, a humidifier 235, and a humidifier 236. The sheet manufacturing apparatus 100 also includes a blower 261, a blower 262, and a blower 263.

The sheet manufacturing apparatus 100 executes the following processes in sequence: a feedstock supply process, a crushing process, a defibration process, a sorting process, a first web forming process, a dividing process, a mixing process, a disentangling process, a second web forming process, a sheet forming process, and a cutting process.

Explanation follows regarding the configuration of each of these sections. The feedstock supply section 11 is the section where the feedstock supply process is performed, in which a feedstock M1 is supplied into the crushing section 12. Examples of the feedstock M1 include sheet-form materials made from fiber-containing materials that include cellulose fibers. Cellulose fibers are any material formed into a fibrous shape that has cellulose as the main component compound thereof. The cellulose fibers may include hemicellulose, lignin, or the like in addition to cellulose. There is no particular limitation to the form of the feedstock M1, which may be woven, non-woven, or the like. The feedstock M1 may, for example, be recycled-paper manufactured by defibrating and reusing old paper, or synthetic paper such as YUPO paper (registered trademark). The feedstock M1 is not necessarily recycled paper. The feedstock M1 in the present embodiment is old paper that may be either previously used or scrap.

The crushing section 12 is the section where the crushing process is performed, in which the feedstock M1 supplied from the feedstock supply section 11 is crushed in air, such as in atmospheric air. The crushing section 12 includes a pair of crushing blades 121, and a chute 122.

The pair of crushing blades 121 rotate in opposite directions to each other so as to crush the feedstock M1 between the blades, i.e. so as to be able to cut the feedstock M1 into coarse fragments M2. The shape and size of the coarse fragments M2 are preferably tailored to the defibration process in the defibration section 13 and are, for example, preferably small fragments with a side length of not more than 100 mm, and more preferably small fragments with a side length from 10 mm to 70 mm.

The chute 122 is disposed below the pair of crushing blades 121 and is, for example, configured with a funnel shape. The chute 122 is thereby able to receive falling coarse fragments M2 that have been crushed by the crushing blades 121.

The humidifier 231 is disposed above the chute 122 and alongside the pair of crushing blades 121. The humidifier 231 humidifies the coarse fragments M2 inside the chute 122. The humidifier 231 is configured by a warm air vaporizing humidifier device that includes a moist non-illustrated filter and that feeds humidified air of raised humidity into the coarse fragments M2 by passing air through the filter. Feeding the humidified air into the coarse fragments M2 enables the coarse fragments M2 to be suppressed from adhering with static electricity to the chute 122 or the like.

The chute 122 is coupled to the defibration section 13 by a pipe 241. The coarse fragments M2 collected in the chute 122 transported through the pipe 241 to the defibration section 13.

The defibration section 13 is the section that performs the defibration process on the coarse fragments M2 in air, namely performs dry defibration. A defibrated material M3 can be generated from the coarse fragments M2 by performing defibration processing in the defibration section 13. "Defibration" as referred to herein means taking the coarse fragments M2 configured from plural fibers bound together, and disentangling the fibers into individual fibers. The disentangled product is what is referred to as the defibrated material M3. The defibrated material M3 may be in the form of lines or strips. There may still be defibrated material M3 present that is somewhat intertwined in agglomerations, i.e. formed into what is referred to as "clumps".

The defibration section 13 of the present embodiment is, for example, configured by an impeller mill including a high speed rotating blade 131 and a liner positioned around the outer periphery of the rotating blade 131. The coarse fragments M2 flowing into the defibration section 13 are squeezed between the rotating blade 131 and the liner and defibrated thereby.

The defibration section 13 is able to generate a flow of air, i.e. an airflow, from the crushing section 12 toward the sorting section 14 by rotation of the rotating blade 131. This enables the coarse fragments M2 to be sucked into the defibration section 13 through the pipe 241. After the defibration process, the defibrated material M3 can then be sent on toward the sorting section 14 through a pipe 242.

The blower 261 is installed partway along the pipe 242. The blower 261 is an airflow generating device for generating an airflow toward the sorting section 14. This promotes transportation of the defibrated material M3 toward the sorting section 14.

The detection section 29 detects an electric charge amount of the defibrated material M3, and is configured by a static electricity sensor. The detection section 29 is installed between the defibration section 13 and the blower 261, and detects the electric charge amount of the defibrated material M3 directly after being discharged through a discharge outlet 130 of the defibration section 13. This enables the electric charge amount arising in the defibrated material M3 in the defibration section 13 to be detected promptly. This accordingly enables the revolution speed of the rotating blade 131 to be modified promptly, as described later.

There is no particular limitation to the method employed by the detection section 29. This may, for example, employ a contact method whereby the detection section 29 is installed to the pipe 242 and detects the electric charge amount of the defibrated material M3 by direct contact with the defibrated material M3, or may employ a non-contact method whereby the detection section 29 is installed either inside or outside the pipe 242 and detects the electric charge amount based on changes in electrostatic capacitance as the defibrated material M3 passes through the pipe 242.

The sorting section 14 is the section where the sorting process is performed, in which the defibrated material M3 is sorted into long and short fibers. The defibrated material M3 is sorted in the sorting section 14 into a first sorting M4-1, and a second sorting M4-2 larger than the first sorting M4-1. The first sorting M4-1 is for fibers of a length suitable for manufacturing a sheet S at a later stage. The average length in the first sorting M4-1 is preferably from 1 μm to 30 μm. The second sorting M4-2 includes, for example, insufficiently defibrated fibers, defibrated fibers that have aggregated together excessively, etc.

The sorting section 14 includes a drum 141, and a housing 142 housing the drum 141.

The drum 141 is configured by a cylindrical mesh, and is a sieve that rotates about its own central axis. The defibrated material M3 flows into the drum 141. Rotation of the drum 141 sorts defibrated material M3 smaller than the size of the mesh into the first sorting M4-1, and sorts defibrated material M3 equal to or larger than the mesh size into the second sorting M4-2.

The first sorting M4-1 falls through the drum 141.

The second sorting M4-2 is fed out into a pipe 243 coupled to the drum 141. The opposite end of the pipe 243 to the drum 141, namely the downstream end thereof, is coupled to the pipe 241. The second sorting M4-2 that has passed through the pipe 243 merges with the coarse fragments M2 inside the pipe 241, and flows back into the defibration section 13 together with the coarse fragments M2. The second sorting M4-2 is thereby returned to the defibration section 13, and is subjected to defibration processing together with the coarse fragments M2.

The first sorting M4-1 from the drum 141 falls while being dispersed in the air, and falls toward the first web forming section 15 positioned below the drum 141. The first web forming section 15 is the section where the first web forming process is performed, in which a first web M5 is formed from the first sorting M4-1. The first web forming section 15 includes a mesh belt 151, three tension rollers 152, and a suction section 153.

The mesh belt 151 is an endless belt for the first sorting M4-1 to accumulate on. The mesh belt 151 is entrained around the three tension rollers 152. The first sorting M4-1 lying on the mesh belt 151 is transported downstream by rotational driving of the tension rollers 152.

The first sorting M4-1 is configured by fibers equal to or larger than the mesh size of the mesh belt 151. The first sorting M4-1 is thereby restricted from passing through the mesh belt 151, and can accordingly be accumulated on the mesh belt 151. The first sorting M4-1 is formed into a layer as the first web M5 by accumulating on the mesh belt 151 while being transported downstream along with the mesh belt 151.

There is a concern that there might, for example, be dirt and dust etc. mixed in with the first sorting M4-1. The dirt and dust is, for example, generated by the crushing and defibration. Such dirt and dust is collected in the collection section 27, described later.

The suction section 153 is a suction mechanism that suctions air downwards from the mesh belt 151. The dirt and dust that has passed through the mesh belt 151 can thereby be suctioned along with the air.

The suction section 153 is coupled through a pipe 244 to the collection section 27. The dirt and dust suctioned by the suction section 153 are collected in the collection section 27.

A pipe 245 is also coupled to the collection section 27. The blower 262 is installed partway along the pipe 245. This enables a suction force to be generated at the suction section 153 by operation of the blower 262. The formation of the first web M5 on the mesh belt 151 is promoted thereby. The first web M5 has had the dirt and dust etc. removed therefrom. The dirt and dust passes through the pipe 244 and is delivered to the collection section 27 by operation of the blower 262.

The housing 142 is coupled to the humidifier 232. The humidifier 232 is configured by a vaporizing humidifier device similar to the humidifier 231. Humidified air is thereby fed into the housing 142. The first sorting M4-1 can be humidified by the humidified air, enabling the first sorting M4-1 to be suppressed from adhering with static electricity to the inside walls of the housing 142.

The humidifier 235 is disposed downstream of the sorting section 14. The humidifier 235 is configured by an ultrasonic humidifier device that creates a mist of water. This enables moisture to be supplied to the first web M5, thereby adjusting the moisture content of the first web M5. Such adjustment enables the first web M5 to be suppressed from adhering with static electricity to the mesh belt 151. The first web M5 is thereby readily separated from the mesh belt 151 at the position where the mesh belt 151 returns on itself around one of the tension rollers 152.

The shredding section 16 is disposed downstream of the humidifier 235. The shredding section 16 is the section where the dividing process is performed, in which the first web M5 that has separated from the mesh belt 151 is divided. The shredding section 16 includes a rotatably supported propeller 161 and a housing 162 housing the propeller 161. The first web M5 can be divided by the rotating propeller 161. The first web M5 when divided becomes shreddings M6. The shreddings M6 fall inside the housing 162.

The housing 162 is coupled to the humidifier 233. The humidifier 233 is configured by a vaporizing humidifier device similar to the humidifier 231. Humidified air is thereby fed into the housing 162. The humidified air enables the shreddings M6 to be suppressed from adhering with static electricity to the propeller 161 and the inside walls of the housing 162.

The mixer 17 is disposed downstream of the shredding section 16. The mixer 17 is the section where the mixing process is performed, in which the shreddings M6 and a resin P1 are mixed together. The mixer 17 includes a resin feeder 171, a pipe 172, and a blower 173.

The pipe 172 couples the housing 162 of the shredding section 16 and a housing 182 of the disentangling section 18 together, and is a flow path for a mixed material M7, a mixture of the shreddings M6 and the resin P1, to pass through.

The resin feeder 171 is coupled partway along the pipe 172. The resin feeder 171 includes a screw feeder 174. The resin P1 can be fed into the pipe 172 as a powder or as granules by rotational driving of the screw feeder 174. The resin P1 fed into the pipe 172 is mixed with the shreddings M6 to form the mixed material M7.

The resin P1 is employed to bind fibers together in a later process and although it may, for example, be a thermoplastic resin or curable resin, a thermoplastic resin is preferably employed therefor. Examples of such thermoplastic resins include: AS resins; ABS resins; polyolefins and modified polyolefins such as such as polyethylene, polypropylene, ethylene-vinyl acetate copolymer (EVA) and the like; acrylic resins such as poly (methyl methacrylate); polyesters such as polyvinyl chloride, polystyrene, polyethylene terephthalate, polybutylene terephthalate and the like; polyamides (NYLON) such as NYLON 6, NYLON 46, NYLON 66, NYLON 610, NYLON 612, NYLON 11, NYLON 12, NYLON 6-12, NYLON 6-66 and the like; polyphenylene ethers; polyacetals; polyethers; polyphenylene oxides;

polyether ether ketones; polycarbonates; polyphenylene sulfides; thermoplastic polyimides; polyether imides; liquid crystal polymers such as aromatic polyesters; and various types of thermoplastic elastomer such as styrene-based, polyolefin-based, polyvinyl chloride-based, polyurethane-based, polyester-based, polyamide-based, polybutadiene-based, transpolyisoprene-based, fluorine rubber-based, or chlorinated polyethylene-based thermoplastic elastomers. One resin selected from the above resins may be employed as the thermoplastic resin alone, or two or more resins selected therefrom may be employed in combination. A polyester resin or a resin including polyester is preferably employed as the thermoplastic resin.

In addition to the resin P1, other substances may also be fed out from the resin feeder 171. These include a colorant to color the fibers, an anti-caking agent to suppress aggregation of the fibers and aggregation of the resin P1, a fire retardant to render the fibers etc. less liable to combust, and a paper strengthening agent to increase the paper strength of the sheet S. Alternatively these other substances may be compounded with the resin P1 in advance before then being fed out from the resin feeder 171.

The blower 173 is installed partway along the pipe 172 at a position downstream of the resin feeder 171. The shreddings M6 and the resin P1 are mixed together by the action of a rotating section such as fan blades of the blower 173. The blower 173 is capable of generating an airflow toward the disentangling section 18. The shreddings M6 and the resin P1 can be stirred inside the pipe 172 by this airflow. The mixed material M7 can accordingly be introduced into the disentangling section 18 in a state in which the shreddings M6 and the resin P1 have been uniformly dispersed. The shreddings M6 in the mixed material M7 are disentangled by the process of passing through the inside of the pipe 172 so as to result in a finer fibrous form.

The disentangling section 18 is the section where the disentangling process is performed to disentangle the intertwined fibers in the mixed material M7 from each other. The disentangling section 18 includes a drum 181 and the housing 182 housing the drum 181.

The drum 181 is a configured by a cylindrical mesh, and is a sieve that rotates about its own central axis. The mixed material M7 flows into the drum 181. Rotation of the drum 181 enables the fibers and the like in mixed material M7 smaller than the size of the mesh to pass through the drum 181. The mixed material M7 is disentangled by this action.

The housing 182 is coupled to the humidifier 234. The humidifier 234 is configured by a vaporizing humidifier device similar to the humidifier 231. Humidified air is thereby fed into the housing 182. The inside of the housing 182 can be humidified by the humidified air, enabling the mixed material M7 to be suppressed from adhering with static electricity to the inside walls of the housing 182.

The mixed material M7 disentangled by the drum 181 is dispersed in the air while falling toward the second web forming section 19 positioned below the drum 181. The second web forming section 19 is the section where the second web forming process is performed to form a second web M8 from the mixed material M7. The second web forming section 19 includes a mesh belt 191, tension rollers 192, and a suction section 193.

The mesh belt 191 is an endless belt for the mixed material M7 to accumulate on. The mesh belt 191 is entrained around the four tension rollers 192. The mixed material M7 on the mesh belt 191 is transported downstream by rotational driving of the tension rollers 192.

Almost all of the mixed material M7 on the mesh belt 191 is the size of the mesh of the mesh belt 191 or larger. This enables the mixed material M7 to be restricted from passing through the mesh belt 191, and thereby enables the mixed material M7 to be accumulated on the mesh belt 191. The mixed material M7 is formed into a layer as the second web M8 by accumulating on the mesh belt 191 while being transported downstream along with the mesh belt 191.

The suction section 193 is a suction mechanism that suctions air downwards from the mesh belt 191. This enables the mixed material M7 on the mesh belt 191 to be suctioned, thereby promoting accumulation of the mixed material M7 on the mesh belt 191.

A pipe 246 is coupled to the suction section 193. The blower 263 is installed partway along the pipe 246. A suction force can be generated at the suction section 193 by operation of the blower 263.

The humidifier 236 is disposed downstream of the disentangling section 18. The humidifier 236 is configured by an ultrasonic humidifier device similar to the humidifier 235. This enables moisture to be supplied to the second web M8, thereby adjusting the moisture content of the second web M8. Such adjustment enables the second web M8 to be suppressed from adhering with static electricity to the mesh belt 191. The second web M8 is thereby readily separated from the mesh belt 191 at the position where the mesh belt 191 returns on itself around one of the tension rollers 192.

The total moisture content added by the humidifier 231 to the humidifier 236 is, for example, preferably from 0.5 parts by mass to 20 parts by mass with respect to 100 parts by mass of material prior to humidification.

The sheet forming section 20 is disposed downstream of the second web forming section 19. The sheet forming section 20 is the section where the sheet forming process is performed to form the sheet S from the second web M8. The sheet forming section 20 includes a press section 201 and a heating section 202.

The press section 201 includes a pair of calender rollers 203. The second web M8 can be pressed between the calender rollers 203 without being heated. The density of the second web M8 is raised thereby. The level of heating at this point is, for example, preferably a level of heating that will not melt the resin P1. The second web M8 is then transported toward the heating section 202. One of the pair of calender rollers 203 is a lead roller driven by operation of a non-illustrated motor, and the other is a following roller.

The heating section 202 includes a pair of heating rollers 204. The second web M8 can be pressed between the heating rollers 204 while being heated. The resin P1 is melted by the heating and pressing, and the fibers in the second web M8 are bonded together by the molten resin P1. The sheet S is formed thereby. The sheet S is then transported toward the cutting section 21. One of the pair of heating rollers 204 is a lead roller driven by operation of a non-illustrated motor, and the other is a following roller.

The cutting section 21 is disposed downstream of the sheet forming section 20. The cutting section 21 is the section where the cutting process is performed to cut the sheet S. The cutting section 21 includes first cutters 211 and second cutters 212.

The first cutters 211 cut the sheet S along a direction intersecting with the transport direction of the sheet S, and in particular a direction orthogonal thereto.

The second cutters 212 cut the sheet S in a direction parallel to the transport direction of the sheet S downstream of the first cutters 211. This cutting removes unwanted portions at end portions on both sides of the sheet S, i.e. end portions in the +y axis direction and the −y axis direction, so as to fix the width of the sheet S. The portions removed by this cutting are called "offcuts".

A sheet S of the desired shape and size is obtained by this cutting by the first cutters 211 and the second cutters 212. Each sheet S is then transported further downstream and stacked in the stacking section 22.

Each of the sections of the sheet manufacturing apparatus 100 is electrically coupled to the control section 28. The control section 28 controls operation of each of these sections.

The control section 28 includes a central processing unit (CPU) 281 and a storage section 282. The CPU 281 may, for example, perform various determination and issue various commands and the like.

The storage section 282 is stored with various programs, such as a program for manufacturing the sheet S, and is stored with a calibration curve K and various other calibration curves and tables etc., as described later.

The control section 28 may be built into the sheet manufacturing apparatus 100, or may be provided as a peripheral device such as an external computer. Examples of such a peripheral device include, for example, cases in which the peripheral device is in communication with the sheet manufacturing apparatus 100 through a cable or the like, cases employing wireless communication, and cases in which the peripheral device is coupled to the sheet manufacturing apparatus 100 over a network such as the Internet.

The CPU 281 and the storage section 282 may, for example, be integrated together into a single unit, or the CPU 281 may be built into the sheet manufacturing apparatus 100 and the storage section 282 provided as a peripheral device such as an external computer. Alternatively the storage section 282 may be built into the sheet manufacturing apparatus 100 and the CPU 281 provided as a peripheral device such as an external computer.

When the coarse fragments M2 are defibrated by the defibration section 13, depending on the type of feedstock M1 supplied to the sheet manufacturing apparatus 100, the feed rate per unit time, and the like, static electricity may be generated in the fibers of the defibrated material M3 due to contact with the rotating blade 131. Depending on the amount of electric charge, the fibers may clump together when being transported downstream from the defibration section 13. When the second web M8 is formed while such clumps are still present, this may lead to uneven thickness in the second web M8. When this second web M8 is then used to form a sheet S, this may lead to uneven thickness in the sheet S and a reduction in the quality of the sheet S. In the present disclosure, adopting the below configuration enables such issues to be prevented.

In the present disclosure, the control section 28 includes a first mode, a second mode, and a third mode, as well as a standard mode, described later. One of these modes is selected, and the selected mode is set. The sheet manufacturing apparatus 100 is configured to implement the selected mode by outputting an implementation command for the selected mode. In the present specification, "mode" refers for example to a program stored in advance in the storage section 282.

The first mode is a mode in which an operating condition of the defibration section 13 is set based on a detection result of the detection section 29. The second mode is a mode in which the revolution speed of the rotating blade 131 of the defibration section 13 is set based on information input to the input section 30 regarding the material supplied by the feedstock supply section 11. The third mode is a mode in which an operating condition of the defibration section 13 is set based on information input to the input section 30, this being information correlated to the electric charge amount of the defibrated material M3.

Operating in any of the first mode, the second mode, or the third mode enables the quality of the sheet S to be raised, as described later.

The standard mode is a mode in which the sheet S is manufactured with the rotating blade 131 rotated at a preset revolution speed, with none of the adjustments performed in the first mode, the second mode, or the third mode. The revolution speed of the rotating blade 131 in the standard mode may for example be any value in a range from 3000 rpm to 12000 rpm.

When operating in the standard mode, the revolution speed of the rotating blade 131 is constant regardless of the material being supplied to the defibration section 13, thereby enabling defibration and web and sheet manufacture to be performed with a constant cycle time, and is thereby advantageous in terms of providing excellent productivity.

Each of these modes can be selected using the input section 30.

As illustrated in FIG. 2, the input section 30 is a touch panel monitor including an input screen 300. The input section 30 is electrically coupled to the control section 28. The input section 30 is not limited to being a touch panel monitor, and may be configured by a monitor and separately installed buttons, or configured by buttons alone.

An "A" button 30A, a "B" button 30B, a "C" button 30C, a "D" button 30D, an "E" button 30E, an "F" button 30F, and an OK button 30G are displayed on the input screen 300.

When an operator presses any of the button 30A, the button 30B, or the button 30C and any of the button 30D, the button 30E, or the button 30F followed by the OK button 30G, a signal corresponding to the pressed buttons is transmitted to the control section 28, and the corresponding mode is set by the control section 28.

The first mode is set and implemented by pressing the button 30A and the OK button 30G in sequence. The second mode, described later in a second embodiment, is set and implemented by pressing the button 30B and the OK button 30G in sequence. The third mode, described later in a third embodiment, is set and implemented by pressing the button 30C and the OK button 30G in sequence.

When any one of the button 30A to the button 30C and at least one of the button 30D to the button 30F are pressed followed by the OK button 30G, this enables other settings to be added to the corresponding mode out of the first mode to the third mode and implemented. This is explained in a fourth embodiment.

In the sheet manufacturing apparatus 100, when one of the button 30D to the button 30F is pressed followed by the OK button 30G without pressing any of the button 30A to the button 30C, operation of the corresponding button 30D to button 30F is invalid.

When the OK button 30G is pressed without pressing any of the button 30A to the button 30F, the standard mode is selected.

Moreover, when the OK button 30G is not pressed within a predetermined duration after pressing any of the button 30A to the button 30F, the pressed button becomes invalid and the standard mode is selected.

In the present embodiment, explanation is given regarding a case in which the first mode is implemented, with reference to the flowchart illustrated in FIG. 4. The following explanation is regarding steps taken after a step in which the button 30A and the OK button 30G have been pressed in sequence, and manufacture of the sheet S starts.

First, at step S101, the electric charge amount of the defibrated material M3 generated in the defibration section 13 is detected.

Then, at step S102, determination is made as to whether or not the electric charge amount detected at step S101 is at or above a predetermined value S0 illustrated in FIG. 3. The predetermined electric charge amount value S0 is a threshold value stored in the storage section 282 in advance, and is for example a value derived by testing.

When determination is made that the electric charge amount is the predetermined value S0 or above at step S102, at step S103, the revolution speed of the rotating blade 131 is adjusted, i.e. the revolution speed of the rotating blade 131 is lowered.

At this step, the actual revolution speed of the rotating blade 131 is decided based on the calibration curve K illustrated in FIG. 3. The calibration curve K is for example a plot of the optimal revolution speed of the rotating blade 131 against the electric charge amount as obtained by testing, and is stored in the storage section 282 in advance.

Current flow conditions, such as the pattern or size of a current to a non-illustrated motor of the rotating blade 131, are modified so as to attain the decided revolution speed. Such current flow conditions are decided based on a non-illustrated calibration curve, table, or the like representing a relationship between the current flow conditions and the revolution speed. In the first mode, the revolution speed of the rotating blade 131 may be adjusted to any value within a range of from 2500 rpm to 10000 rpm.

Adjusting the revolution speed of the rotating blade 131 in the above manner enables the regularity and speed with which the rotating blade 131 and the fibers make contact during defibration of the coarse fragments M2 to be adjusted. This enables the amount of static electricity generated in the fibers to be adjusted, such that the fibers can be prevented from forming clumps. This enables the occurrence of excessively uneven thickness in the obtained sheet S to be prevented, enabling the quality of the sheet S to be raised.

When determination is made that the electric charge amount is less than the predetermined value S0 at step S102, at step S104, the existing state is maintained, i.e. processing transitions to step S105 without modifying the revolution speed of the rotating blade 131.

At step S105, determination is made as to whether or not the program relating to sheet manufacture has ended. When determination is made that the program has not ended, processing returns to step S101, and the subsequent steps are repeated in sequence.

As described above, the web manufacturing apparatus 1 includes the defibration section 13 that is configured to defibrate the coarse fragments M2, this being a material containing fiber, the detection section 29 configured to detect the electric charge amount of the defibrated material M3 obtained by the defibration section 13, and the control section 28 configured to control operation of the defibration section 13. The control section 28 includes the first mode in which the revolution speed of the rotating blade 131 is set based on a detection result of the detection section 29.

In the present disclosure, adjusting an operating condition of the defibration section 13 according to the electric charge amount of the defibrated material M3 defibrated by the defibration section 13 in this manner enables the electric charge amount in the defibration section 13 to be suppressed. This in turn enables clump formation to be suppressed when transporting the defibrated material M3 to form the second web M8, thereby enabling the uniformity of the thickness of the obtained second web M8 to be improved. A high quality sheet S with uniform thickness can then be obtained by forming the second web M8 into a sheet shape.

The sheet manufacturing apparatus 100 enables selection of the first mode or the second mode or third mode, described later, these being modes in which quality is raised, or the standard mode, in which the cycle time is maintained even at the expense of some quality. This enables a user to appropriately select whether to prioritize quality or to prioritize productivity.

Electric charging of the fibers is greatly affected by contact with the rotating blade 131 that rotates at high speed. The control section 28 is configured capable of adjusting the revolution speed of the rotating blade 131, enabling electric charging of the fibers to be efficiently suppressed.

Moreover, the sheet manufacturing apparatus 100 includes the web manufacturing apparatus 1 and the sheet forming section 20 that forms the second web M8, this being a web manufactured by the web manufacturing apparatus 1, into a sheet shape. This enables the sheet S to be manufactured while obtaining the previously described advantages of the web manufacturing apparatus 1.

Second Embodiment

Figure 5:
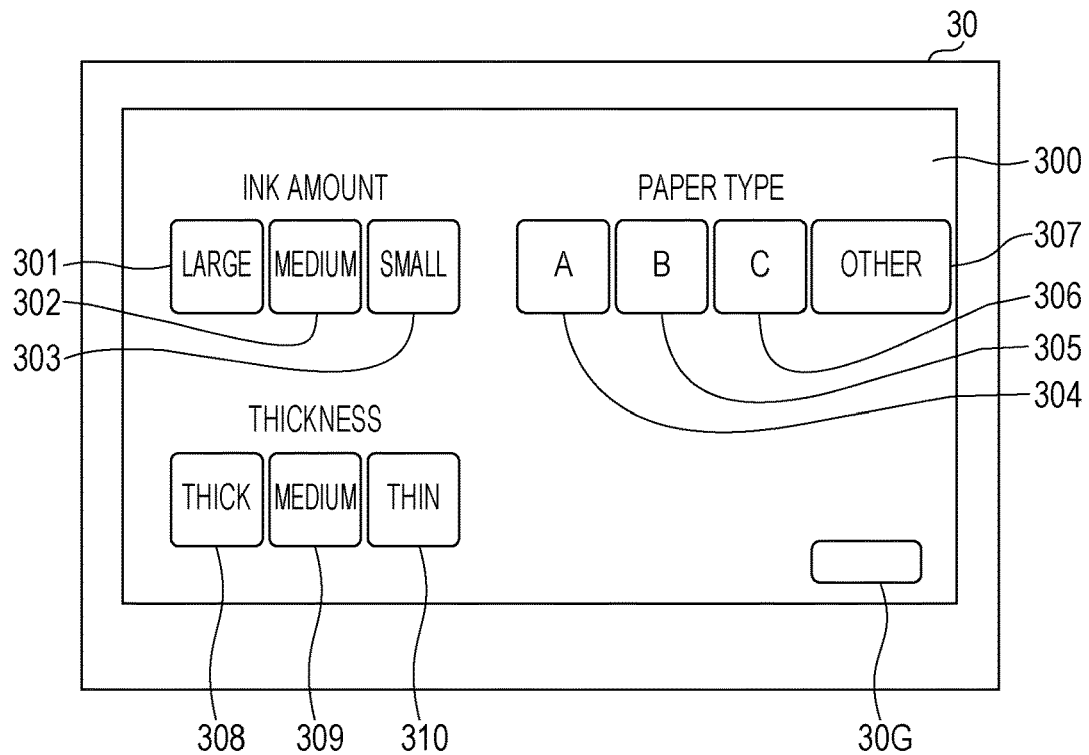
FIG. 5 is a diagram illustrating an example of a screen of an input section of a second embodiment of a sheet manufacturing apparatus of the present disclosure.
Figure 6:
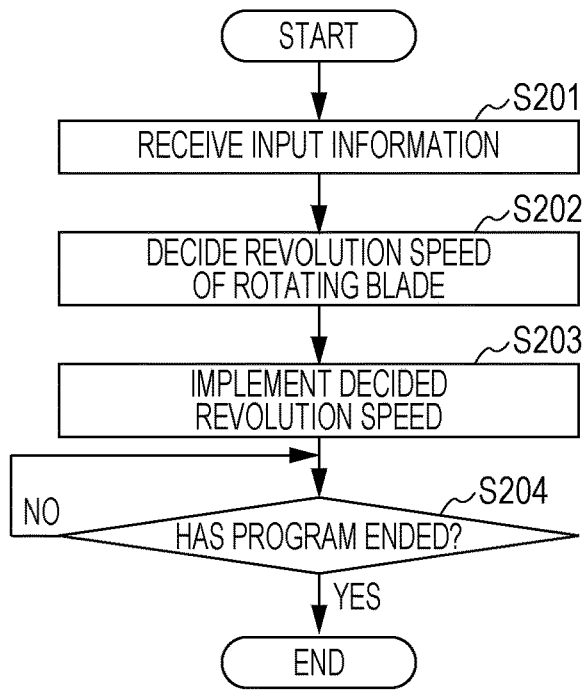
FIG. 6 is a flowchart for explaining a control operation executed by a control section of the second embodiment of a sheet manufacturing apparatus of the present disclosure.

FIG. 5 is a diagram illustrating an example of a screen of an input section of the second embodiment of a sheet manufacturing apparatus of the present disclosure. FIG. 6 is a flowchart for explaining a control operation executed by a control section in the second embodiment of a sheet manufacturing apparatus of the present disclosure.

Explanation follows regarding the second embodiment of a web manufacturing apparatus and a sheet manufacturing apparatus of the present disclosure, with reference to the drawings. The following explanation is focused on the differences to the embodiment described above, and explanation of similar matter thereto will be omitted.

The present embodiment is similar to the first embodiment, with the exception that the screen displayed on the input section and the control operation by the control section are different.

In the present embodiment, explanation is given regarding the second mode, implemented when the button 30B and the OK button 30G are pressed in sequence on the input section 30 illustrated in FIG. 2. When the button 30B and the OK button 30G are pressed in sequence, as illustrated in FIG. 5, an input screen 300 for inputting information regarding feedstock M1 conditions is displayed on the input section 30.

Three buttons (a button 301, a button 302, and a button 303) enabling the amount of ink adhered to the feedstock M1 to be selected from three levels, four buttons (a button 304, a button 305, a button 306, and a button 307) enabling selection of the paper type of the feedstock M1, three buttons (a button 308, a button 309, and a button 310) enabling the paper thickness of the feedstock M1 to be selected from three levels, and an OK button 30G are displayed on the input screen 300.

The susceptibility to charging varies according to the amount of ink adhered to the feedstock M1. Electric charging of defibrated fibers tends to occur more readily as the amount of ink increases. Selecting the ink amount using the button 301 to the button 303 enables information relevant to the susceptibility to charging to be input.

The source material and additives in the fibers differ according to the paper type, and the susceptibility to charging varies according to these conditions. Selecting the paper type using the button 304 to the button 307 enables information relevant to the susceptibility to charging to be input.

For a fixed number of sheets supplied per unit time, the fiber supply amount per unit time varies according to the paper thickness of the feedstock M1. Selecting the thickness using the button 308 to the button 310 enables information relevant to the susceptibility to charging to be input.

Explanation follows regarding the control operation of the control section 28 with reference to the flowchart illustrated in FIG. 6.

First, at step S201, the information selected using the input screen 300 is received. At this step, one of the button 301 to the button 303, one of the button 304 to the button 307, one of the button 308 to the button 310, and the OK button 30G are pressed, and this information is received.

At step S202, the revolution speed of the rotating blade 131 is decided based on the information represented by the buttons pressed at step S201. At this step, a decision is made based on a table representing relationships between combinations of buttons pressed and the revolution speed of the rotating blade 131. This table is generated in advance based on testing and is stored in the storage section 282.

Next, at step S203, sheet manufacturing starts with the rotating blade 131 being rotated at the revolution speed decided at step S202.

Then, at step S204, determination is made as to whether or not the program relating to sheet manufacturing has ended. The processing of step S204 is repeated until the program is determined to have ended.

As described above, the web manufacturing apparatus 1 includes the defibration section 13 that includes the rotating blade 131 and is configured to defibrate a material containing fiber, the feedstock supply section 11 serving as a supply section configured to supply the material to the defibration section 13, the input section 30 to which information relating to a condition of the material to be supplied to the defibration section 13 by the feedstock supply section 11 is input, and the control section 28 configured to control operation of the defibration section 13. The control section 28 includes the second mode in which the revolution speed of the rotating blade 131 is set based on the information.

This enables an operating condition of the defibration section 13 to be adjusted in response to information relating to the material supplied to the defibration section 13, i.e. information relevant to the susceptibility to charging. This enables the electric charge amount in the defibration section 13 to be suppressed. This in turn enables clump formation to be suppressed when transporting the defibrated material M3 to form the second web M8, thereby enabling the uniformity of the thickness of the obtained second web M8 to be improved. A high quality sheet S with uniform thickness can then be obtained by forming the second web M8 into a sheet shape.

As previously described, the information relating to material conditions input to the control section 28 using the input section 30 includes at least one of the paper type as selected using the button 304 to the button 307 and the paper supply rate per unit time as selected using the button 308 to the button 310. Controlling an operating condition of the defibration section 13 based on this information enables the electric charge amount of the defibrated material M3 to be more effectively suppressed.

Third Embodiment

Figure 7:
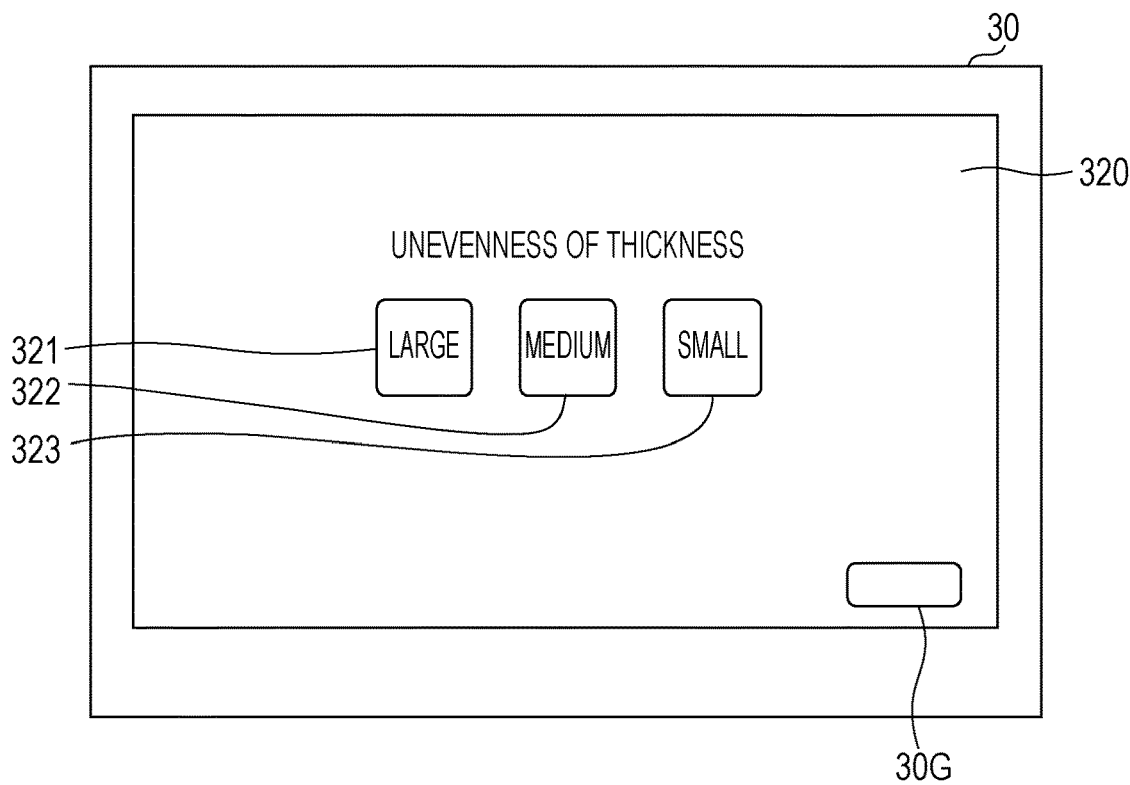
FIG. 7 is a diagram illustrating an example of a screen of an input section of a third embodiment of a sheet manufacturing apparatus of the present disclosure.
Figure 8:
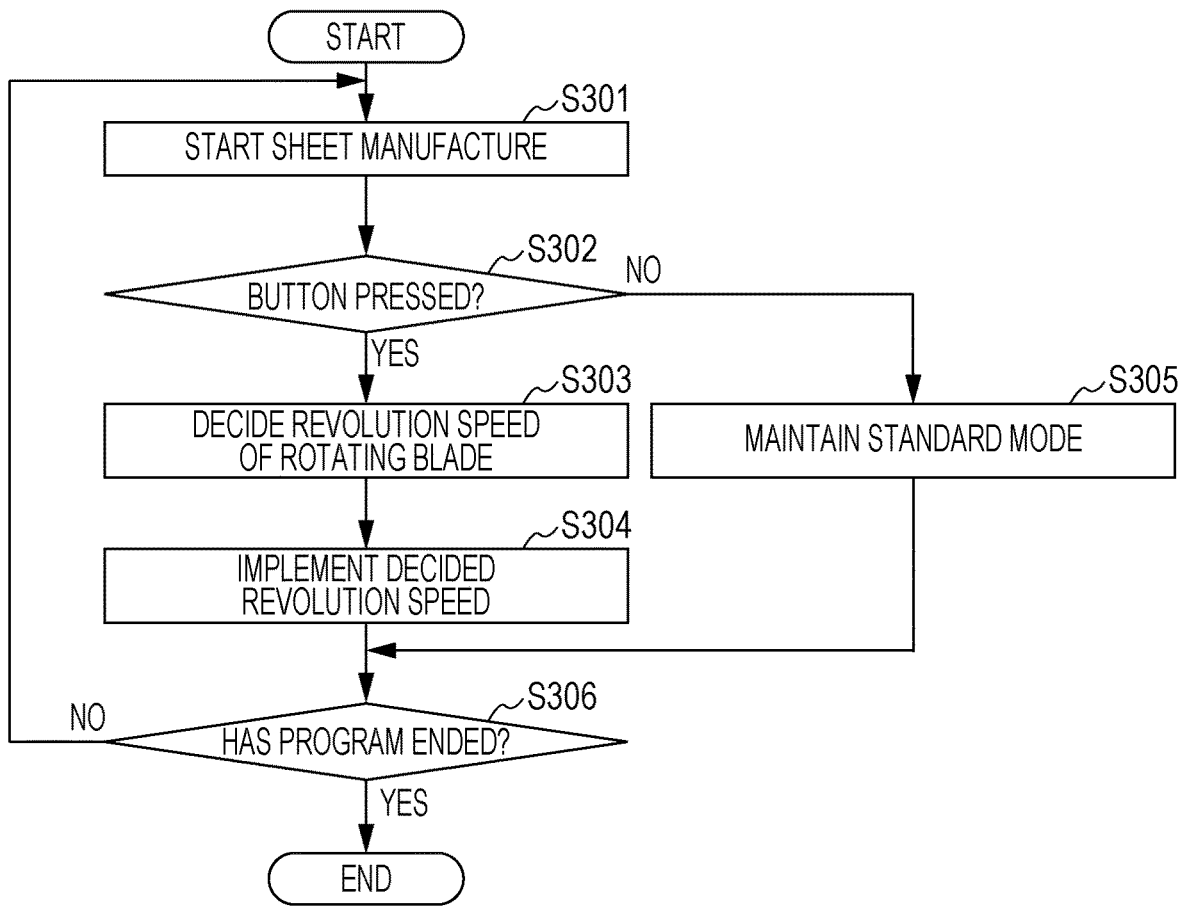
FIG. 8 is a flowchart for explaining a control operation executed by a control section of the third embodiment of a sheet manufacturing apparatus of the present disclosure.

FIG. 7 is a diagram illustrating an example of a screen of an input section of the third embodiment of a sheet manufacturing apparatus of the present disclosure. FIG. 8 is a flowchart for explaining a control operation executed by a control section of the third embodiment of a sheet manufacturing apparatus of the present disclosure.

Explanation follows regarding the third embodiment of a web manufacturing apparatus and a sheet manufacturing apparatus of the present disclosure, with reference to the drawings. The following explanation is focused on the differences to the embodiments described above, and explanation of similar matter thereto will be omitted.

The present embodiment is similar to the first embodiment, with the exception that the screen displayed on the input section and the control operation by the control section are different.

In the present embodiment, explanation is given regarding the third mode, implemented when the button 30C and the OK button 30G are pressed in sequence on the input section 30 illustrated in FIG. 2. When the button 30C and the OK button 30G are pressed in sequence, first, sheet manufacturing starts in the standard mode. Then, as illustrated in FIG. 7, an input screen 320 for inputting information relating to a condition of the feedstock M1 is displayed on the input section 30 during sheet manufacturing.

A button 321, a button 322, and a button 323 for indicating the unevenness in the thickness of the manufactured sheet S are displayed on the input screen 320.

As previously described, correlation exists between uneven thickness of the sheet S and the electric charge amount of the fibers of the defibrated material M3, whereby the greater the electric charge amount, the greater the unevenness in the thickness of the sheet S will be. The electric charge amount of the fibers during manufacture of the sheet S can be input by an operator checking the obtained sheet S and selecting the button 321 to the button 323 to input the unevenness in the thickness.

Explanation follows regarding the control operation by the control section 28, with reference to the flowchart in FIG. 8.

First, sheet manufacture starts at step S301. The sheet manufacture starts in the standard mode at this step.

Next, at step S302, determination is made as to whether or not any of the button 321 to the button 323 on the input screen 320 illustrated in FIG. 7 and the OK button 30G have been pressed. When determination is made that these buttons have been pressed at step S302, at step S303 the revolution speed setting of the rotating blade 131 is updated in response to the pressed button pattern, i.e. whether (1) the button 321 and the OK button 30G were pressed, (2) the button 322 and the OK button 30G were pressed, or (3) the button 323 and the OK button 30G were pressed.

The revolution speed of the rotating blade 131 is decided based on a table illustrating relationships between the patterns (1), (2), and (3) and the revolution speed of the rotating blade 131. This table is generated in advance based on testing and is stored in the storage section 282.

Next, at step S304, the revolution speed set at step S303 is implemented, i.e. the rotating blade 131 is rotated at the revolution speed set at step S303.

When determination is made at step S302 that these buttons have not been pressed, i.e. that none of the patterns (1), (2), or (3) have been performed, at step S305, the standard mode is maintained.

Then, at step S306, determination is made as to whether or not the program relating to sheet manufacturing has ended. At step S306, when determination is made that the program has not ended, processing returns to step S301, and the subsequent steps are repeated in sequence.

As described above, the web manufacturing apparatus 1 includes the defibration section 13 that includes the rotating blade 131 and is configured to defibrate a material containing fiber, the input section 30 to which information correlated to the electric charge amount of the defibrated material M3 obtained by the defibration section 13 is input, and the control section 28 configured to control operation of the defibration section 13. The control section 28 includes the third mode in which the revolution speed of the rotating blade 131 is set based on the information.

Thus, information correlated to the electric charge amount is input based on the quality of the obtained sheet S, enabling the operating conditions of the defibration section 13 to be adjusted in response thereto. This enables the electric charge amount in the defibration section 13 to be suppressed. This in turn enables clump formation to be suppressed when transporting the defibrated material M3 to form the second web M8, thereby enabling the uniformity of the thickness of the obtained second web M8 to be improved. A high quality sheet S with uniform thickness can then be obtained by forming the second web M8 into a sheet shape.

Although the unevenness in the thickness of the obtained sheet S has been given as an example of information correlated to the electric charge amount of the defibrated material M3 in the present embodiment, there is no limitation thereto. For example, the information may be unevenness in the color of the obtained sheet S, unevenness in the moisture content of the obtained sheet S, or unevenness in the weight of the obtained sheet S.

Fourth Embodiment

Figure 9:
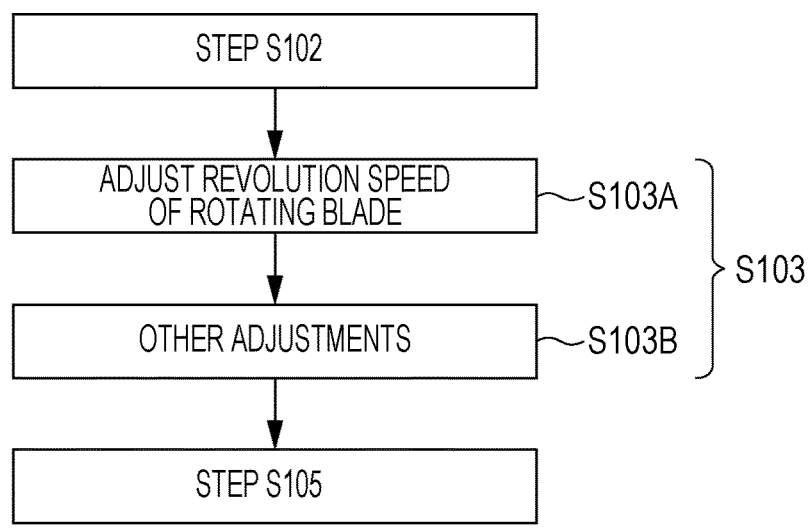
FIG. 9 is a flowchart for explaining a control operation executed by a control section of a fourth embodiment of a sheet manufacturing apparatus of the present disclosure.

FIG. 9 is a flowchart for explaining a control operation executed by a control section of the fourth embodiment of a sheet manufacturing apparatus of the present disclosure.

Explanation follows regarding the fourth embodiment of a web manufacturing apparatus and the sheet manufacturing apparatus of the present disclosure, with reference to the drawings. The following explanation is focused on the differences to the embodiments described above, and explanation of similar matter thereto will be omitted.

The present embodiment is similar to the first embodiment, with the exception that the control operation by the control section is different.

When any of the button 30A to the button 30C is pressed together with the button 30D and the OK button 30G on the input section 30 illustrated in FIG. 2, in addition to the control of the defibration section 13 explained in the previous embodiments, a mode for adjusting the supply rate of the feedstock M1 from the feedstock supply section 11 to the defibration section 13 is set and implemented.

When any of the button 30A to the button 30C is pressed together with the button 30E and the OK button 30G, in addition to the control of the defibration section 13 explained in the previous embodiments, a mode for adjusting an operation condition of the sorting section 14 is set and implemented.

When any of the button 30A to the button 30C is pressed together with the button 30F and the OK button 30G, in addition to the control of the defibration section 13 explained in the previous embodiments, a mode for adjusting the supply rate of the resin P1 from the resin feeder 171 and the humidification amount by the humidifier 231 to the humidifier 236 is set and implemented.

Explanation follows regarding the control operation by the control section 28. Explanation follows regarding cases in which the button 30A is pressed together with the button 30D to the button 30F, and the OK button 30G. The additional advantageous effects explained below may also be obtained when either the button 30B or the button 30C is pressed together with the button 30D to the button 30F, and the OK button 30G.

As illustrated in FIG. 9, in the present embodiment, step S103 includes a step S103A and a step S103B.

At step S103A, the revolution speed of the rotating blade 131 is lowered similarly to in the first embodiment.

Then, at step S103B, respective operating conditions of the feedstock supply section 11, the sorting section 14, the mesh belt 151, the resin feeder 171, the drum 181, the mesh belt 191, the calender rollers 203, the heating rollers 204, the first cutters 211, the second cutters 212, the humidifier 231, the humidifier 232, the humidifier 233, the humidifier 234, the humidifier 235, or the humidifier 236 are adjusted as other adjustments.

At this step, the speed of a non-illustrated feeder of the feedstock supply section 11 is lowered to lower the supply rate of the feedstock M1. This adjustment is performed based on a calibration curve, table, or the like representing a relationship between the supply rate of the feedstock M1 and the revolution speed of the rotating blade 131.

In this manner, the control section 28 can adjust the supply rate to the defibration section 13, thereby enabling the amount of fiber supplied to the defibration section 13 per unit time to be reduced. This enables an amount of fiber appropriate to the revolution speed of the rotating blade 131 to be supplied, enabling the electric charge amount of the defibrated material M3 to be even more effectively controlled. This enables the quality of the sheet S to be further raised.

Moreover, at the present step, the revolution speed of a non-illustrated motor of the drum 141 of the sorting section 14 is lowered, thereby lowering the transportation speed of the defibrated material M3 per unit time. This adjustment is performed based on a calibration curve, table, or the like representing a relationship between the supply rate of the feedstock M1 and the revolution speed of the rotating blade 131.

In this manner, the control section 28 can adjust operating conditions such as the amount of material that builds up inside the sorting section 14 and the operating speed of the sieve of the sorting section 14, thereby enabling the fibers to be suppressed from rubbing against each other and generating static electricity as the defibrated material M3 is transported. This enables the electric charge amount of the defibrated material M3 to be even more effectively controlled. This enables the quality of the sheet S to be further raised.

Moreover, at the present step, the revolution speed of a non-illustrated motor of the screw feeder 174 of the resin feeder 171 is lowered, thereby lowering the supply rate of the resin P1 to the resin feeder 171. This adjustment is performed based on a calibration curve, table, or the like representing a relationship between the revolution speed of the rotating blade 131 and the supply rate of the resin P1.

In this manner, the control section 28 can adjust the supply rate of the resin P1 using the resin feeder 171, thereby enabling the proportion of the resin P1 with respect to the fibers of the defibrated material M3 to be kept as close to constant as possible. This enables the quality of the sheet S to be maintained.

Moreover, at the present step, the humidification amount by the humidifier 231, the humidifier 232, the humidifier 233, the humidifier 234, the humidifier 235, and the humidifier 236 is adjusted. This adjustment is performed based on a calibration curve, table, or the like representing a relationship between the revolution speed of the rotating blade 131 and the humidification amount.

In this manner, the control section 28 can adjust the humidification amount by the humidifier 231 to the humidifier 236, thereby enabling the moisture content with respect to the defibrated material M3 to be kept as close to constant as possible. This enables the quality of the sheet S to be maintained.

Although cases in which the button 30A is pressed together with the buttons 30D to 30F, and the OK button 30G have been explained in the present embodiment, when any one or any two of the buttons 30D to 30F are pressed, the above-described adjustments corresponding to these buttons may be combined.

Embodiments of a web manufacturing apparatus and a sheet manufacturing apparatus of the present disclosure have been explained above with reference to the drawings. However, the present disclosure is not limited to the above explanation, and each section configuring the web manufacturing apparatus and the sheet manufacturing apparatus may be replaced by a desired configuration capable of exhibiting similar functionality. Moreover, other configurations may be added as desired.

The web manufacturing apparatus and the sheet manufacturing apparatus of the present disclosure may also combine the configurations and characteristics of any two or more of the above embodiments.

What is claimed is:

1. A web manufacturing apparatus comprising:
   a defibration section that includes a rotating blade and is configured to defibrate a material containing fiber;
   a detection section that includes a static electricity sensor, the static electricity sensor being connected to an outlet of the defibration section and configured to detect an electric charge amount of a defibrated material obtained by the defibration section; and
   a control section configured to control operation of the defibration section, wherein
   the control section includes a first mode in which a revolution speed of the rotating blade is set based on the electric charge amount detected by the static electricity sensor, and
   the detection section includes a static electricity sensor that detects the electric charge amount.

2. The web manufacturing apparatus according to claim 1, wherein
   the defibration section includes a discharge outlet configured to discharge the defibrated material, and
   the detection section is configured to detect an electric charge amount of the defibrated material discharged through the discharge outlet.

3. The web manufacturing apparatus according to claim 1, wherein the control section is configured to adjust a supply rate of the material to be supplied to the defibration section.

4. The web manufacturing apparatus according to claim 1, further comprising a sorting section configured to sort the defibrated material by sieving, wherein
   the control section is configured to adjust an operating condition of the sorting section.

5. The web manufacturing apparatus according to claim 1, further comprising a resin supply section configured to supply resin to the defibrated material, wherein
   the control section is configured to adjust a supply rate of the resin from the resin supply section.

6. The web manufacturing apparatus according to claim 1, further comprising a humidifier configured to humidify the defibrated material, wherein
   the control section is configured to adjust a humidification amount by the humidifier.

7. A sheet manufacturing apparatus comprising:
   the web manufacturing apparatus according to claim 1; and
   a sheet forming section configured to form a web manufactured by the web manufacturing apparatus into a sheet shape.

* * * * *